United States Patent [19]

Schaeper

[11] Patent Number: 4,580,628

[45] Date of Patent: Apr. 8, 1986

[54] BLOWOUT PREVENTER STACKS AND METHOD OF TENSIONING STACK TIE RODS

[75] Inventor: Gary R. Schaeper, Houston, Tex.

[73] Assignee: Cameron Iron Works, Inc., Houston, Tex.

[21] Appl. No.: 601,860

[22] Filed: Apr. 19, 1984

[51] Int. Cl.⁴ .................... E21B 19/00; B25B 29/02
[52] U.S. Cl. ..................... 166/85; 166/75.1; 166/379; 81/57.38; 403/260
[58] Field of Search ............... 166/379, 75 R, 85, 96; 81/57.38; 254/29 A; 251/1 R, 1 B, 1 A; 73/46; 403/260, 258, 261; 175/218

[56] References Cited

U.S. PATENT DOCUMENTS

| | | | |
|---|---|---|---|
| 2,749,078 | 6/1956 | Losey | 277/129 |
| 3,015,975 | 1/1962 | Biach | 81/56 |
| 3,391,735 | 7/1968 | Schramm et al. | 166/85 |
| 4,007,782 | 2/1977 | Nybo et al. | 166/85 |
| 4,246,810 | 1/1981 | Keske | 81/57.38 |
| 4,268,011 | 5/1981 | Randall | 81/57.38 |

FOREIGN PATENT DOCUMENTS 1152345  5/1969  United Kingdom ............ 254/29 A

Primary Examiner—James A. Leppink
Assistant Examiner—Hoang C. Dang
Attorney, Agent, or Firm—Vinson & Elkins

[57] ABSTRACT

An improved blowout preventer stack including a plurality of ram type blowout preventers, an annular blowout preventer, a plurality of tie rods connecting said blowout preventers into a stack, the upper ends of the rods being secured to the side of the upper member of the stack and the lower end of the rods being secured to the lower end of the stack with securing means to maintain the preset tension in the tie rods. An improved test stump is provided to support the stack and connect to and exert tension on the tie rods responsive to pressure supplied to the test stump to preset the tension therein. The improved method of the present invention includes the step of assembling the components into a stack supported on the test stump, securing the tie rods to the upper member of the stack, connecting the pressure responsive means of the test stump to the lower end of the tie rods, supplying pressure to the pressure responsive means of the test stump to pretension the tie rods and tightening the securing means on the end of the tie rods to maintain the preset tension in the tie rods.

5 Claims, 4 Drawing Figures

BLOWOUT PREVENTER STACKS AND METHOD OF TENSIONING STACK TIE RODS

BACKGROUND

In the drilling of oil and gas wells, such drilling takes place through blowout preventers (BOPs) to provide the necessary potential to control any substantial pressure and blowouts. Usually a plurality of ram type blowouts preventers are stacked one above the other and are topped by an annular type blowout preventer. Generally, it has been the custom to provide each of the blowout preventers with upper and lower necks and flanges or clamp hubs for providing the sealed connection between each of the structures of the stack. In both land and offshore drilling the height of the blowout preventer stack directly relates to the size and cost of the drilling rig, i.e., stacks of greater height require larger rigs and thus increase the cost of drilling.

Efforts have been made in the past to provide a blowout preventer stack which is connected by tie rods and does not require the necks and flanges or hubs to make such connection. U.S. Pat. No. 2,749,078 to T. B. Losey is an example of this type of prior art structure. Such structure includes openings through the bodies of the ram type preventers through which the studs extend that tie the individual preventers together. Nuts are threaded onto each end of the studs to tighten the stack. The assembly of such a stack on a drill rig does not save any substantial height in the rig because the studs would, of necessity, have to be lowered through the stack from above and this results in the height requirements for the rig which are substantially the same if not greater as for other prior art stacks.

The tensioning of the tie rods of these prior devices have required tightening of the nuts. It is difficult to control the tension because of the large size of studs and the variation in the coefficient of friction between the nuts and the bodies they engage and between the nuts and the studs. When such prior stacks have been used they are preferably assembled and the studs tensioned before they are transferred to the drilling location. This results in the rig equipment having to handle the complete stack and not just move it from the test stump to its point of installation on the wellhead. Also, modern large bore high pressure BOP stacks, such as 18¾ inch inside diameter and 15,000 pounds per square inch working pressure, are too large and too heavy to be readily transported when assembled.

The J. L. Biach U.S. Pat. No. 3,015,975 discloses a pressure responsive means for tensioning a bolt. In such device the nut is threaded on the bolt and the pressure responsive device is connected to the protruding end of the bolt above the nut. When pressure is applied, the bolt is tensioned. The crank and gear arrangement rotates a wrench within the device to bring the nut into tight engagement with the surface to maintain the tension and after release of pressure the device is removed.

U.S. Pat. No. 4,268,011 and British Pat. No. 1,492,064 of 1977 disclose pressure responsive tensioning devices which include devices to tension studs in pairs.

British Pat. No. 1,507,606 of 1978 and Russian Pat. No. 541,661 disclose pressure responsive devices for tensioning a series of studs with pressure being applied to establish the tension in the studs and then nuts are tightened to maintain such present tension.

SUMMARY

The present invention relates to an improved method and apparatus for use in drilling wells. The apparatus includes a blowout preventer stack joined by tie rods and a test stump having means for engaging the lower ends of the tie rods and pressure responsive means to impart a force to tension the stack tie rods while the stack is supported on the test stump. The method includes the step of positioning the stack on the test stump, installing the tie rods on the stack, connecting the test stump's engaging means to the lower ends of the tie rods, delivering a pressurized fluid to the stump's pressure responsive means to tension the tie rods, tightening the nuts on the tie rods, removing the pressurized fluid and disconnecting the test stump engaging means from the tie rods. The improved stack includes a plurality of ram type blowout preventers, an annular blowout preventer, means for sealing between the bodies of the blowout preventers when they are assembled into a stack, a plurality of tie rods, means for securing the upper end of the tie rods to the annular blowout preventer and means through which the lower ends of the tie rods extend on the lower end of the preventer bodies and nuts on the lower end of the tie rods for maintaining preset tension in the tie rods.

This invention results in a substantially shorter BOP stack as compared to a BOP stack with conventional connecting means such as flanges or clamp hubs. An example of reduction in height can be seen by considering a typical BOP stack of 18¾ inch 15,000 psi consisting of 4 ram type preventers, 1 annular type preventer, and a hydraulic collet connector on the bottom. Such a stack with conventional connecting means would be approximately 320 inches tall, whereas using a BOP stack of the present invention would result in a height of only approximately 250 inches. This reduction of 70 inches in stack height would allow many drilling rigs, that presently are using 13⅝ inch BOP stacks due to height limitation, to change to 18¾ inch BOP stacks and thereby be able to drill many wells that they otherwise would not have been qualified to drill.

An object of the present invention is to provide an improved method and apparatus for use in drilling a well which allows the use of a shorter drilling structure.

Another object is to provide an improved method and apparatus of the type described which allows delivery of simple modular components of the blowout preventer stack until the stack is to be installed on the well.

A further object is to provide an improved method and apparatus which allows tensioning of the blowout preventer stack tie rods without appreciably increasing the height requirements of the drilling structure.

Still another object is to provide an improved method and apparatus which provides a quick, simple and accurate tensioning of the tie rods connecting a blowout preventer stack on an offshore drilling structure.

A still further object of the present invention is to provide an improved blowout preventer stack which is easily and quickly assembled at the rig and which has both a reduced height and does not require additional rig height over that necessary for its handling and installation.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

It is common practice to provide a test stump on the drilling rig on which a blowout preventer stack can be positioned for assembling and pressure testing the stack before it is lowered into position on the wellhead. The present invention provides an improved test stump which, in combination with the improved stack and its tie rods, provides the advantages desired, as hereinafter more fully explained.

Figure 1:
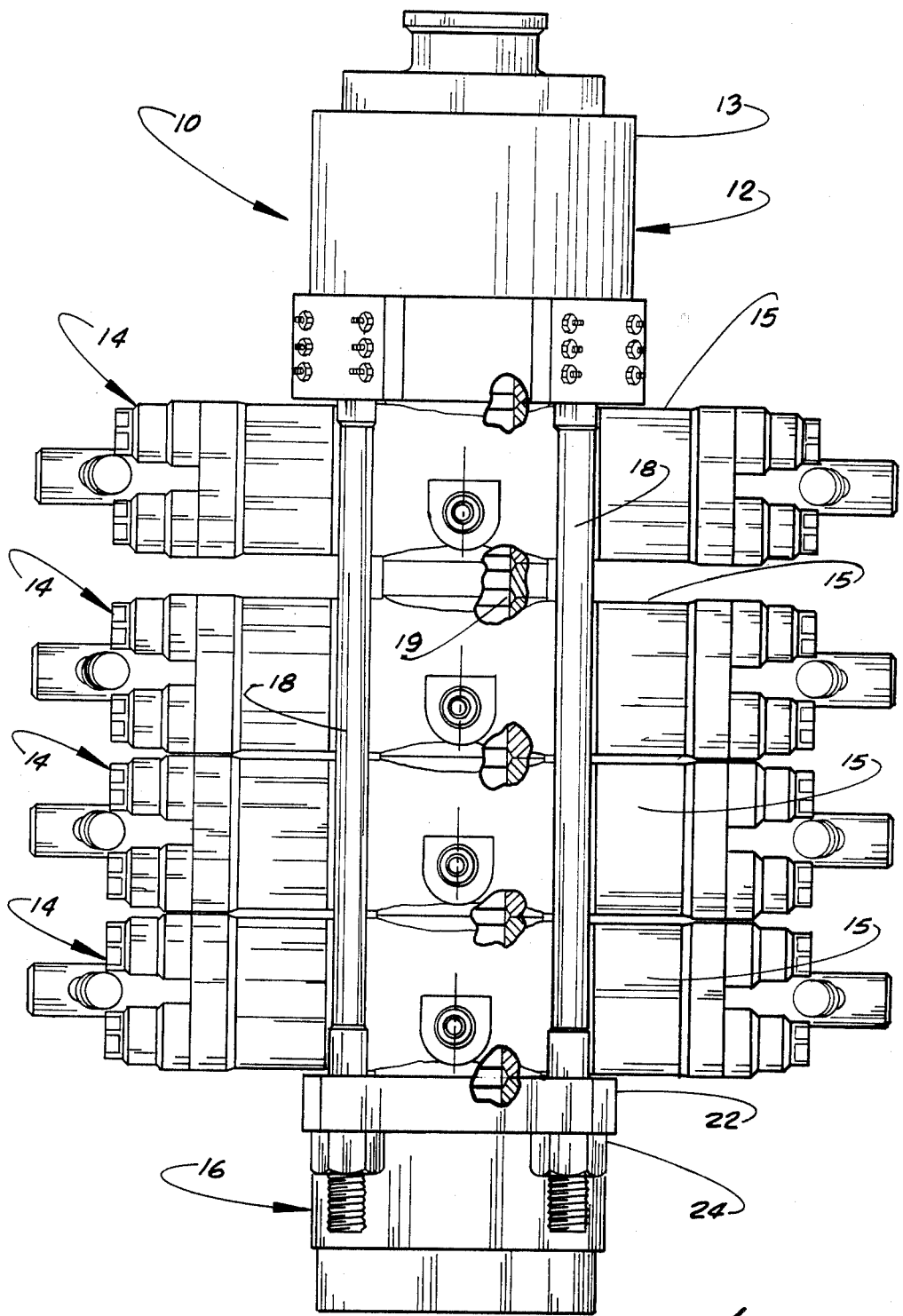
FIG. 1 is an elevation view of the improved stack of the present invention.

The improved blowout preventer stack 10 of the present invention as shown in FIG. 1 includes upper annular blowout preventer 12 having body 13; a plurality of ram type blowout preventers 14 having bodies 15; remote connecting means 16, such as a collet connector, and tie rods 18 which secure the individual components together in tight sealed relationship. Suitable seal rings 19 are provided in grooves between each of the components' bodies to ensure such sealed relationship.

Figure 2:
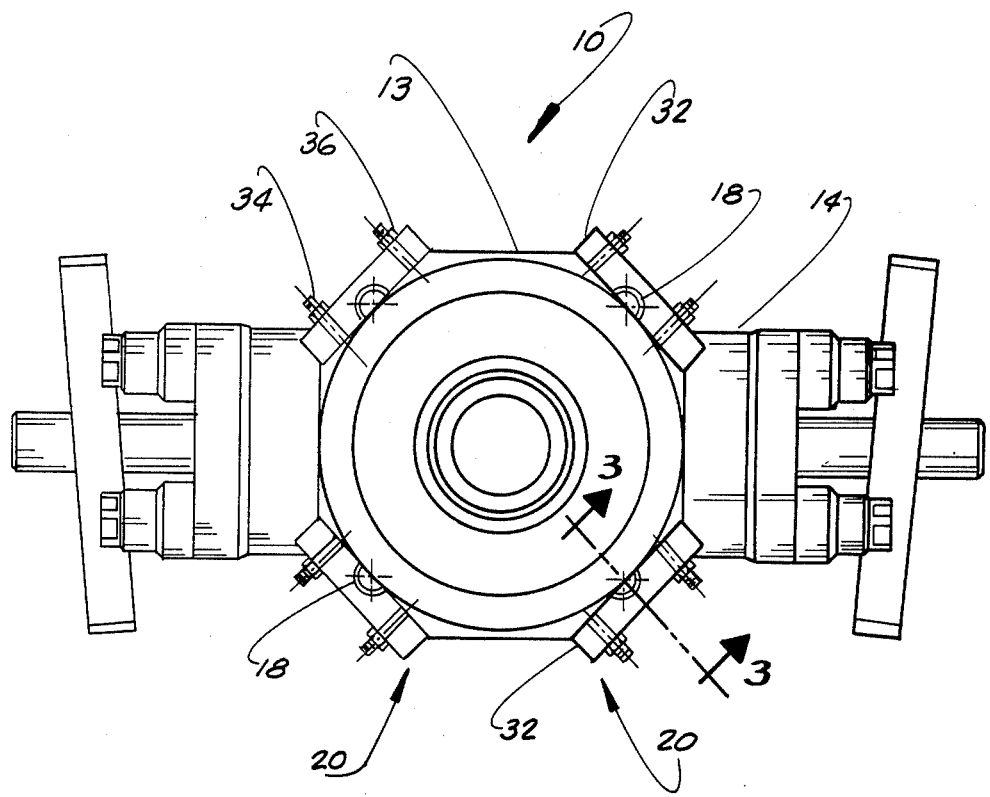
FIG. 2 is a plan view of the improved stack shown in FIG. 1.
Figure 3:
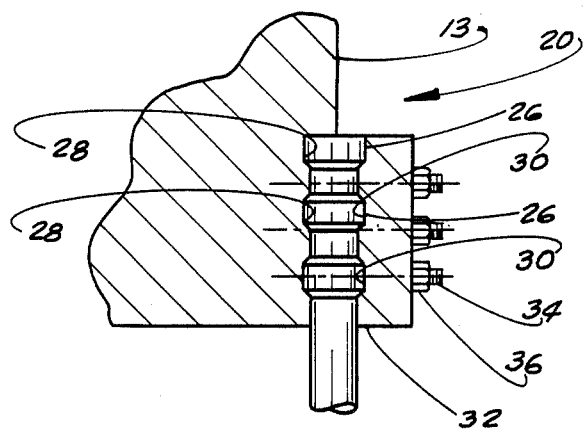
FIG. 3 is a sectional view taken along line 3—3 to illustrate the means for securing the upper ends of the tie rods to the annular blowout preventer body.

The tie rods 18 include means 20 for securing them to the lower portion of annular blowout preventer body 13 and extend downward past the sides of ram type blowout preventers 14, through upper flange 22 on connecting means 16 and are secured by nuts 24 threaded onto the portions of tie rods 18 which extend below flange 22. Means 20 for securing the upper ends of tie rods 18 to annular blowout preventer 12, as seen in FIGS. 2 and 3, includes tie rod flanges 26 projecting outward from the upper end of tie rods 18 engaging in mating grooves 28 in the exterior of the lower portion of annular blowout preventer body 13 and in the mating grooves 30 on the interior of clamps 32. Clamps 32 are secured to annular blowout preventer body 13 by studs 34, which extend into body 13, and by nuts 36 threaded on studs 34. The size and interengagement of tie rod flanges 26 in grooves 28 and 30 are designed to provide sufficient structural integrity of securing means 20 to allow proper tensioning of tie rods 18.

Figure 4:
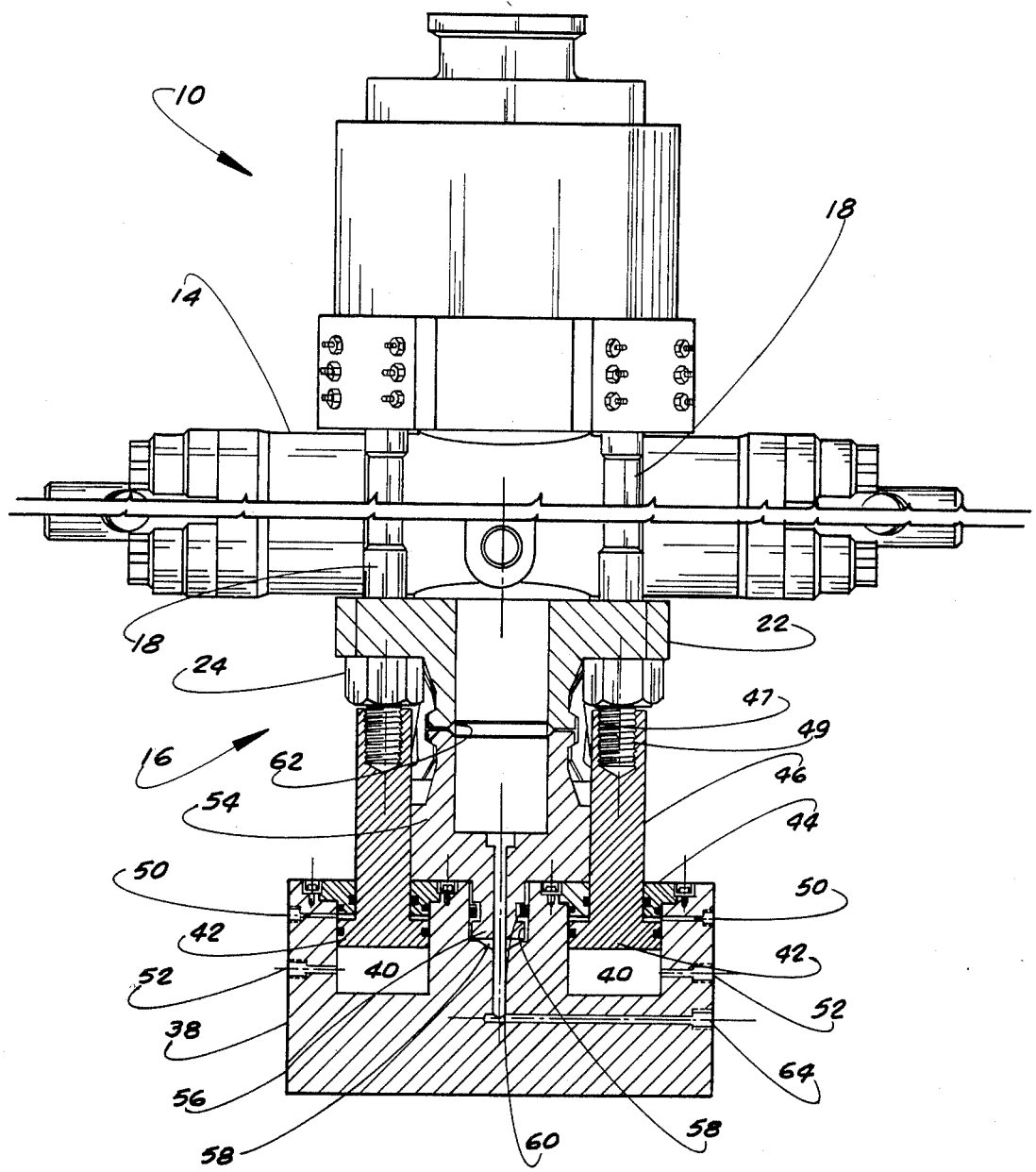
FIG. 4 is an elevation view with portions omitted to illustrate the apparatus for tensioning of the tie rods of the stack.

As shown in FIG. 4, when stack 10 is to be assembled for installation, such assembly takes place on the drilling rig with connector 16 being placed on test stump 38 and the remaining components of stack 10 placed in their desired position thereon with seal rings 19 in the grooves between each component. Tie rods 18 are then positioned through connector flange 22 with their flanges 26 positioned within grooves 28 of body 13 and grooves 30 of clamp 32 and secured with studs 34 and nuts 36.

Test stump 38 is usually firmly attached to the drilling rig structure and includes cylinders 40, one for each of the tie rods 18 with pistons 42 positioned therein and cap rings 44 secured to the upper surface of stump 38 in sealed relationship to piston rods 46 and stump 38. Pistons 42 positioned within cylinders 40 are responsive to pressure in cylinders 40 above and below pistons 42. Ports 50 connect into cylinders 40 above pistons 42 and ports 52 connect into cylinders 40 below pistons 42.

Piston rods 46 have internal threads 47 to allow threading onto the lower ends 49 of tie rods 18. Stump adaptor 54 is positioned on the upper central portion of stump 38 having its tubular projection 56 extending into central cavity 58 in stump 38 with seal ring 60 providing a seal therebetween. Seal ring 62 provides a seal between connector 16 and stump adaptor 54. Stump adaptor 54 is provided with a suitable exterior configuration to engage with the connecting mechanism of connector 16. Port 64 extends into test stump 38 in communication with cavity 58 and the interior of tubular projection 56 of stump adaptor 54. Test pressure for pressure testing stack 10 is supplied through and released from port 64.

When stack 10 has been assembled on test stump 38 with tie rods 18 attached to annular blowout preventer 12 by clamps 32, nuts 36, and studs 34, piston rods 46 are threadedly engaged with the lower ends 49 of tie rods 18. Stump adaptor 54 is directly connected to connector 16 by actuation of the connecting means of connector 16. Tensioning pressure is supplied through all of ports 50 simultaneously so that all of pistons 48 are urged downward at the same time with the same force. This force is transmitted directly to tie rods 18. The pressure supplied is regulated so that the desired preset tension is provided in tie rods 18. When tie rods 18 are properly tensioned, nuts 24 are tightened against flange 22 to maintain such preset tension in tie rods 18. Once tension is set and secured, tensioning pressure can be released. Test pressure can then be supplied through port 64 to pressure test the stack 10.

After a successful pressure test, the piston rods 46 and the lower ends 49 of tie rods 18 are disengaged from one another and connector 16 is released from stump adaptor 54, so that the BOP stack 10 is ready to install on the wellhead.

While the drawings and previous description disclose the preferred form of test stump for providing preset tension to the tie rods it should be understood that the pressure responsive means may be a central piston urging the stack upward with suitable tie rod anchors for securing the lower ends of the tie rods against movement. Also the pistons 42 could be a single annular piston with a shaft connected to each tie rod. The preferred form shown has the advantage of ensuring that the preselected tie rod tension is applied to each tie rod and is not dependent upon the amount of threading of the shafts to the tie rods.

What is claimed is:

1. An apparatus for use on a rig for drilling a well comprising:

a blowout preventer stack including a plurality of members with a flange on the lower stack member and tie rods extending through said flange and being secured to the upper stack member to tie said members of the stack together in sealed relationship and fastening means on the lower ends of said tie rods, and a test stump having means for supporting the stack thereon, having a plurality of engaging means for engaging the lower ends of said tie rods and having pressure responsive means for exerting a downward force on all of said tie rods while said stack is supported by said supporting means to preset tension in said tie rods to allow the fastening means on their lower ends to be tightened to retain the preset tension in said tie rods.

2. An apparatus according to claim 1 wherein said pressure responsive means includes a piston connected to each of said tie rod engaging means and being positioned in a cavity within said test stump, ports extending through said test stump into the upper end of said cavities, and ports extending through said test stump into the lower end of said cavities.

3. A blowout preventer stack comprising a plurality of ram type blowout preventers positioned one upon the other, an annular blowout preventer positioned upon the upper of the ram type blowout preventers to complete the stack, a plurality of tie rods for securing the stack together, said annular blowout preventer having a plurality of vertically extending grooves on its sides in which the upper end of the tie rods may be horizontally inserted to interengage therein and means for closing said grooves with the tie rods therein to secure the upper ends of the tie rods therein, and means for securing the lower end of each of said tie rods to the lower end of said stack after said tie rods have been pretensioned, the securing of the lower end of said tie rods being sufficient to maintain the preset tension in said tie rods, said upper tie rod securing means allowing said tie rods to be secured to the side of said annular blowout preventer.

4. A blowout preventer stack comprising a plurality of ram type blowout preventers positioned one upon the other, an annular blowout preventer positioned upon the upper of the ram type blowout preventers to complete the stack, a plurality of tie rods for securing the stack together, means for securing the upper end of each of said tie rods to the sides of the annular blowout preventer, and means for securing the lower end of each of said tie rods to the lower end of said stack after said tie rods have been pretensioned, the securing of the lower end of said tie rods being sufficient to maintain the preset tension in said tie rods, said upper tie rod securing means allowing said tie rods to be secured to the side of said annular blowout preventer, said securing means for securing the upper ends of said tie rods to the side of said annular blowout preventer including a plurality of annular flanges extending radially outward from the upper end of each of said tie rods, a plurality of half grooves in the exterior of said upper annular blowout preventer body for receiving the upper ends of each of said tie rods, clamps having interior half grooves for receiving the upper ends of said tie rods when positioned against said annular blowout preventer body, and means for securing said clamps to the sides of said annular blowout preventer body to secure the upper end of each of said tie rods in such position.

5. A blowout preventer stack according to claim 4 including a remote connector positioned below the lowermost of said ram type blowout preventer and having a flange extending radially outward beyond the sides of said ram type blowout preventers, said connector flange having a plurality of openings therethrough for receiving the lower ends of said tie rods, and nuts threaded onto the lower ends of said tie rods below said connector flange after the tension is set in each of said tie rods.

* * * * *